United States Patent
Metz (10) Patent No.: US 7,451,200 B2
(45) Date of Patent: Nov. 11, 2008

(54) NETWORK MANAGEMENT TOOL FOR MAINTAINING PRINTING DEVICE INFORMATION

(75) Inventor: James Michael Metz, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 727 days.

(21) Appl. No.: 10/208,407

(22) Filed: Jul. 29, 2002

(65) Prior Publication Data

US 2004/0019671 A1   Jan. 29, 2004

(51) Int. Cl.
G06F 15/173 (2006.01)
(52) U.S. Cl. ............... 709/223; 709/201; 709/224; 709/226; 709/228; 709/229
(58) Field of Classification Search ........... 709/223, 709/201, 226, 229, 228; 710/1, 19, 62
See application file for complete search history.

(56) References Cited

U.S. PATENT DOCUMENTS

| | | | |
|---|---|---|---|
| 4,604,690 A | 8/1986 | Crabtree et al. | |
| 5,828,864 A | 10/1998 | Danknick et al. | |
| 5,832,191 A | 11/1998 | Thorne | |
| 6,041,347 A | 3/2000 | Harsham et al. | |
| 6,061,334 A | 5/2000 | Berlovitch et al. | |
| 6,076,106 A | 6/2000 | Hamner et al. | |
| 6,249,821 B1* | 6/2001 | Agatone et al. | 719/316 |
| 6,295,527 B1 | 9/2001 | McCormack et al. | |
| 6,693,722 B1* | 2/2004 | Mixer, Jr. | 358/1.15 |
| 2003/0005100 A1* | 1/2003 | Barnard et al. | 709/223 |
| 2003/0078965 A1* | 4/2003 | Cocotis et al. | 709/203 |
| 2003/0093521 A1* | 5/2003 | Schlonski et al. | 709/224 |
| 2003/0115302 A1* | 6/2003 | Teraoaka et al. | 709/221 |
| 2003/0121007 A1* | 6/2003 | Coleman | 715/522 |
| 2003/0164977 A1* | 9/2003 | Aagesen | 358/1.15 |
| 2003/0200289 A1* | 10/2003 | Kemp et al. | 709/221 |
| 2003/0200292 A1* | 10/2003 | Kemp et al. | 709/222 |
| 2003/0217357 A1* | 11/2003 | Parry | 717/168 |
| 2004/0185877 A1* | 9/2004 | Asthana et al. | 455/456.6 |

* cited by examiner

Primary Examiner—Yves Dalencourt (57) ABSTRACT

A network management tool is programmed to automatically: discover printing devices on a network; record information about the discovered printing devices in a main device list; and organize at least a portion of the information from the main device list, into one or more secondary device lists based upon criteria that define each of the one or more secondary device lists.

18 Claims, 6 Drawing Sheets

NETWORK MANAGEMENT TOOL FOR MAINTAINING PRINTING DEVICE INFORMATION

TECHNICAL FIELD

The present invention relates to network administration of printing devices.

BACKGROUND

Network administrators currently use network management tools to maintain information about the status of printing devices on a network. Ideally, the network administrator is able to use the network management device to maintain up-to-date information about the characteristics of printing devices on the network. Given the size of many networks, the amount of information maintained by the network management device can often be difficult to view as one list. Additionally, keeping up-to-date with changes to the network when devices are added or deleted can be difficult when the administrator is given the task of viewing an entire list of information pertaining to printing devices on the network.

Accordingly, many network administrators attempt to break the information up into smaller groups of information that are defined by some type of rule, which distinguishes one group from another. For example, one group may include all printing devices that are a certain model type. Another group may include printing devices in a specific location or another certain model type.

In order to keep these groups updated with accurate information, network administrators have to keep themselves apprised of when new printing devices are added to a network. Then the administrators manually populate added devices to various defined groups. However, most network administrators are often unable to keep up with the ever changing configurations of networks. Additionally, maintaining an accurate list of devices for various groups can be burdensome; especially when managing a large and complex network.

SUMMARY

A network management tool for collecting and organizing information about printing devices on a network is described. In one described implementation, a computer system is able to automatically: discover printing devices on a network; record information about the discovered printing devices in a main device list; and organize at least a portion of the information from the main device list into one or more secondary device lists based upon criteria that define each of the one or more secondary device lists.

BRIEF DESCRIPTION OF THE DRAWINGS

The detailed description is described with reference to the accompanying figures. In the figures, the left-most digit(s) of a reference number identifies the figure in which the reference number first appears.

DETAILED DESCRIPTION

The following discussion is directed to a network management system for managing printing devices on a network. The subject matter is described with specificity to meet statutory requirements. However, the description itself is not intended to limit the scope of this patent. Rather, the inventor has contemplated that the claimed subject matter might also be embodied in other ways, to include different elements or combinations of elements similar to the ones described in this document, in conjunction with other present or future technologies.

Figure 1:
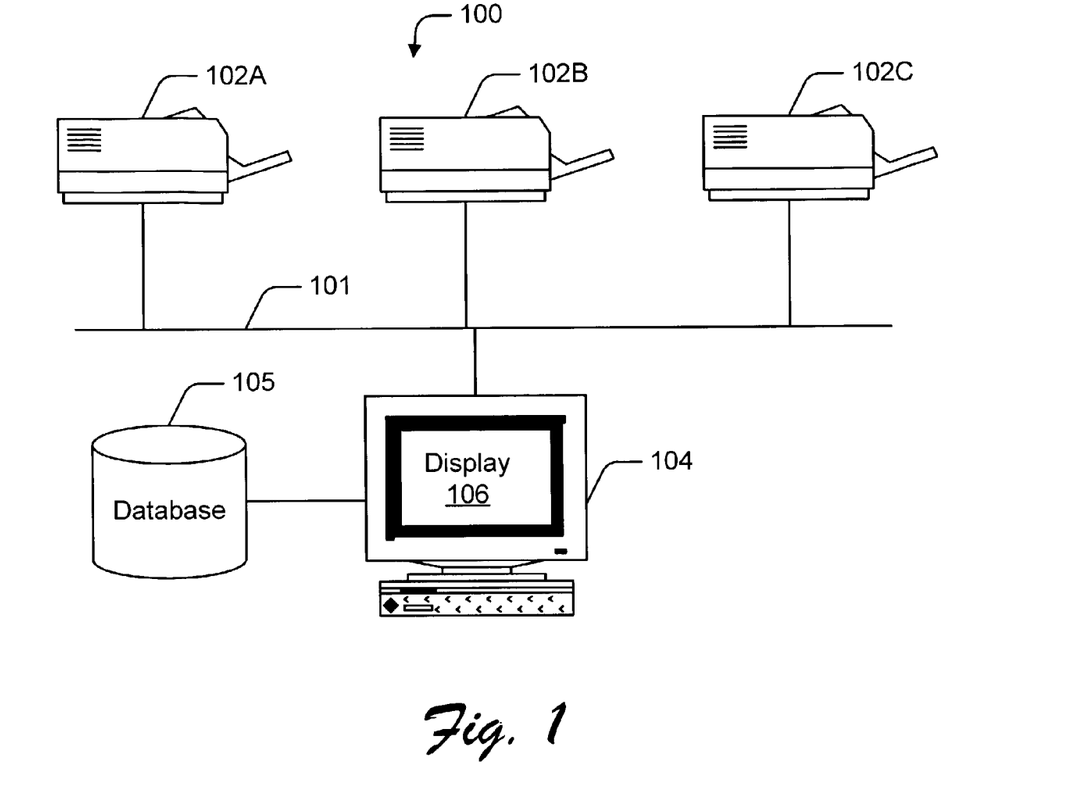
FIG. 1 is a block diagram that illustrates various components of a network in which a network management tool is connected along with printing devices.

FIG. 1 is a block diagram that illustrates various components of a network 100 in which a network management tool 104 is connected along with printing devices 102. The network management tool 104 assists network administrators to install, configure, and manage various network devices, such printing devices 102, on the network 100. The network manager tool 104 can comprise any type of computing device, such as a server or personal computer. Generally, the network manager tool 104 includes a display screen 106 for displaying various user interface screens, data, various network information and device lists associated with the network management tool.

Figure 2:
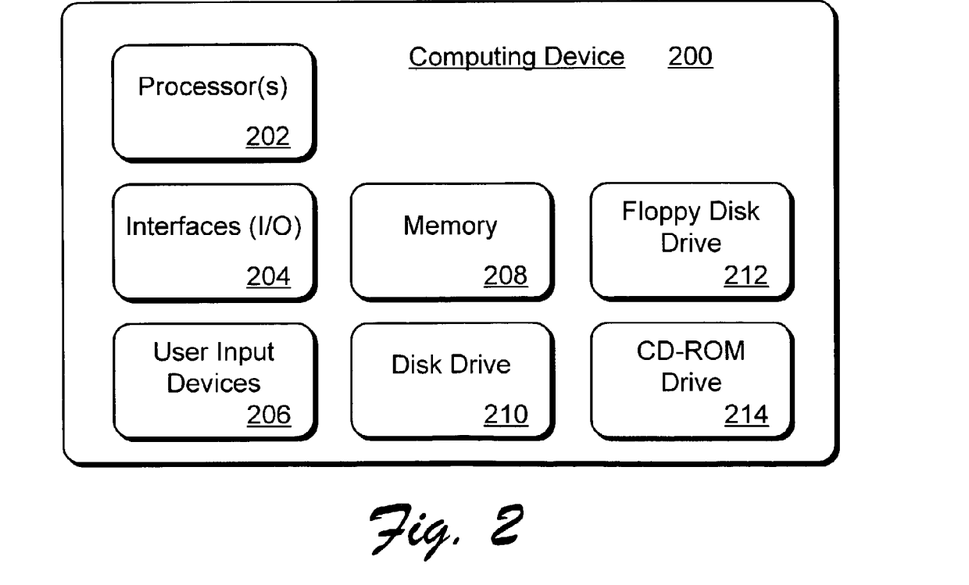
FIG. 2 illustrates various components of an exemplary computing device that can be utilized to implement the techniques carried out by the network management tool.

FIG. 2 illustrates various components of an exemplary computing device 200 that can be utilized to implement the techniques carried out by the network management tool 104. Computing device 200 includes one or more processors 202, interfaces 204 for inputting and outputting data, and user input devices 206. Processor(s) 202 process various instructions to control the operation of computing device 200, while interfaces 204 provide a mechanism for computing device 200 to communicate with other electronic and computing devices. User input devices 206 include a keyboard, mouse, pointing device, or other mechanisms for interacting with, and inputting information to computing device 200.

Computing device 200 may also include a memory 208 (such as ROM and/or RAM), a disk drive 210, a floppy disk drive 212, and a CD-ROM drive 214. Memory 208, disk drive 210, floppy disk drive 212, and CD-ROM drive 214 provide data storage mechanisms (i.e. computer-readable media) for computing device 200. Although not shown for clarity, a system bus typically connects the various components within the computing device 200.

Figure 3:
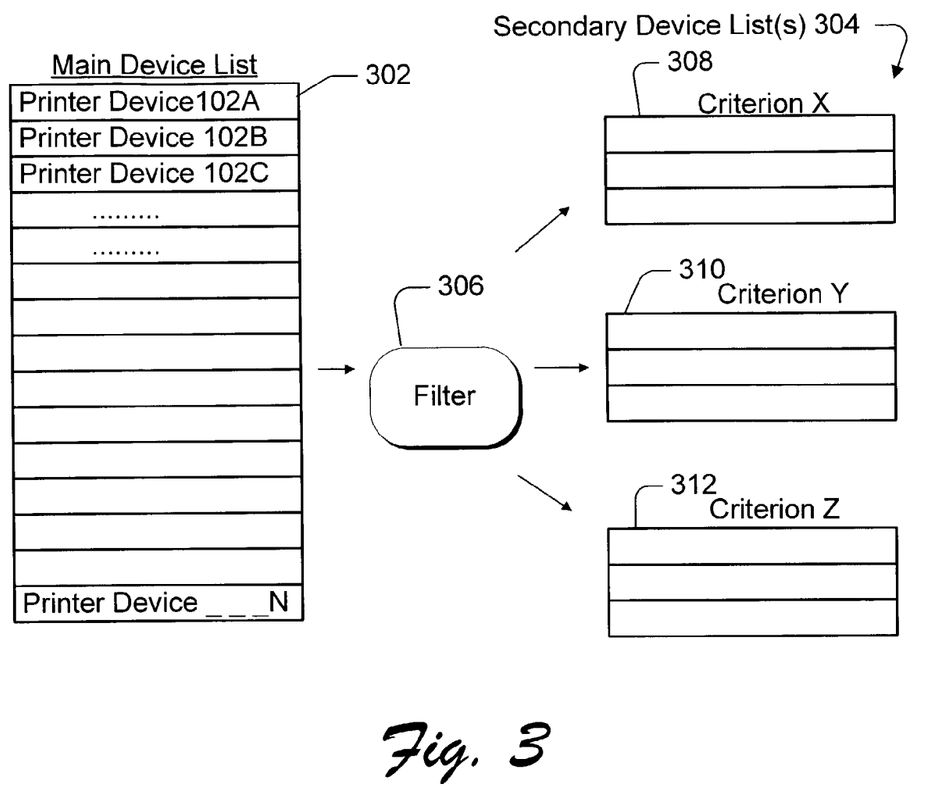
FIG. 3 illustrates a block diagram of data structures (one or more main device lists and one or more secondary device lists) maintained by the network management tool in a database internal to a network management tool or assessable to the network management tool.

In the exemplary illustration, software (i.e., computer executable instructions or logic) installed in memory 208 (or any computer-readable media that can be accessed by a processor) and running on processor(s) 202 of computing device 200 provides the functionality to enable a network management tool 104 to discover printing devices 102 on a network 100; record information about the discovered printing devices 102 in a main device list (302 of FIG. 3 to be described); and organize at least a portion of the information from the main device list, into one or more secondary device lists (304 of FIG. 3 to be described) based upon criteria (308, 310, and 312 of FIG. 3 to be described). This permits users to quickly view more manageable secondary lists of printer devices rather than having to view an entire list of devices. Because the secondary lists are automatically maintained, the burdensome need to manually update a secondary list each time a new printer device is discovered on a network and/or removed from a network is eliminated. In the exemplary implementation, software, the HP WEB JETADMIN, for example, manufactured and sold by Hewlett-Packard Company, Palo Alto, Calif. can be integrated for use with a computer to provide the functionality described herein. Other appropriate types of software, firmware, and/or hardware, nevertheless, can be used to carry out the functionality of the network management tool 104 described herein.

Referring back to FIG. 1, general reference is made herein to one or more printing devices 102, such as exemplary printing devices 102A, 102B and 102C. As used herein, "printing device" means any electronic device having data communications, data storage capabilities, and/or functions to render printed characters and images on a print media. A printing device may be a printer, fax machine, copier, plotter and the like. Examples of printing devices can include, but are not limited to, laser printers, inkjet printers, plotters, portable printing devices, as well as multi-function combination devices.

The network 100 can be any type of network, such as a local area network (LAN) or a wide area network (WAN), using any type of network topology and any network communication protocol. Although only a few devices are shown interconnected via an interconnect 101, a typical network can have any number of devices connected to it, either directly or indirectly via another network. Additionally, the interconnect 101 can be any type of fixed conduit or wireless conduit that facilitates network communication and data transfer.

FIG. 3 illustrates a block diagram representing data structures (one or more main device lists 302 and one or more secondary device lists 304) maintained by the network management tool 104 in a database 105 internal to network management tool 104 or accessible to the network management tool 104. In particular, the network management tool 104 tool creates a main device list 302, by discovering all the printing devices 102 on the network 100 and then recording information associated with the printing devices 102 in the main device list 302. The database 105 can be any type of volatile or nonvolatile memory assessable to network management tool 104. The information can include at a minimum enough information to inform a network administrator that one or more printing devices 102 are connected to the network 100. Additional printing device information can be monitored such as: a model type, hardware address, port, IP address, IP host, status of the printer device, and other related information that is useful to network administrators.

Generally, network management tool 104 can discover printing devices 102 through a number of different techniques. Network management tool 104 can send a query (a general broadcast) to all printing devices on network 100 and listen for responses and/or can monitor the network 100 for signals indicating that printing devices are present on the network 100. The discovery techniques involving broadcasts generally involve issuing some type of packet broadcast such as SMNP packets or SAP packets. For example, an IP or IPX broadcast can initially be sent to the network 100 and the network management tool 104 will wait for responses. If there are too many responses at one time, the network management tool 104 can select specific IP ranges to send broadcasts. Also, specific devices queries can be performed if there is a known address for a device, such as its IP address, IP host name, LAN hardware address, MAC address, or IPX address (i.e., network number/MAC address). The discovery techniques involving monitoring the network 100, involve listening for devices and updating the main device list 302 each time a new printing device 102 is discovered.

The main device list 302 once generated by the network management tool 104 can be updated at regularly scheduled intervals, as in minutes, hours, days, weeks and/or specific dates, etc. As mentioned above, once the main device list 302 is populated with information it can be very extensive, including information associated with up to N printing devices 102 (where N represents any number of devices). To reduce the complexity of such lists and to better assist the network administrator, the network management tool 104 is programmable by a user to filter the information contained in the main device list 302 and organize the information from the main device list into one or more secondary lists 304.

In other words, a filter 306 queries the main device list 302 for information that satisfies one or more criteria for each secondary list 304. As shown in FIG. 3, the criteria include Criterion X, Y and Z that define each of the secondary lists 308, 310, and 312. These criteria can include such things as the specific model type of a printing device, a specific location for printing devices such as building or subnet, printing devices that exceed certain costs, printing devices that have experienced a certain number of repairs, printing devices that have certain capabilities such as color, storage disk, Embedded Web Server technology, printing devices that have exceeded a threshold of a number of pages printed, and other criteria that can be defined by a network administrator. Each time filter 306 locates information matching one or more criteria (e.g., Criterion X, Y and/or Z shown in FIG. 3) such matching information is recorded in the appropriate secondary list. Thus, information from the main list 302 that matches Criterion X's requirements is recorded in secondary list 308, information that matches Criterion Y's requirements is recorded in secondary list 310, and so forth. Although only one criterion is shown for each secondary list 304, it is possible that more than one criterion could be used to create a secondary list. Additionally, any number of secondary lists 304 can be generated depending on the amount of granularity a network administrator desires to monitor.

Filter 306 can be implemented in any number of ways to search the main list 302 for information matching specific criteria. For example, when a printing device 102 is discovered on the network 100, information pertaining to the device, such as its IP address, hostname, printer model, capabilities, etc., is stored in cache (memory 208) of network management tool 104. A user can enter criteria that a printing device must exemplify in order to be populated into a group (secondary device list) of devices. This criteria compared against what is contained in the cache of the network management device and if a match exists, the printer device is added to the group.

Once information is parsed from the main device list 302 into specific secondary lists 304, the network administrator can view one or more of the secondary lists on a display device 106 or other medium such as a printable medium. Generally, the secondary lists 304 have fewer entries than the main list 302 which provides the network administrator with more manageable means to organize and view information generated by the network management tool 104.

Figure 4A:
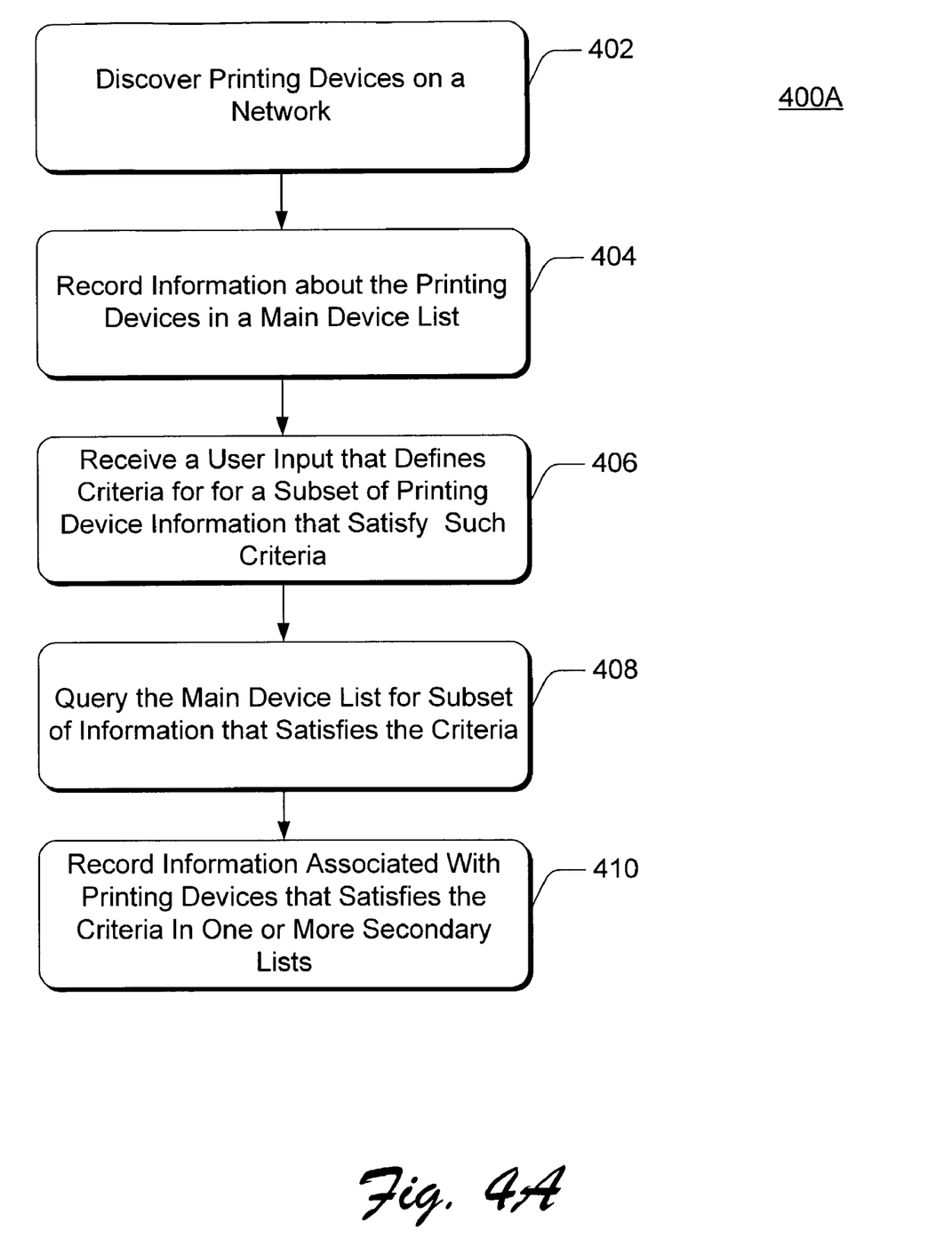
FIG. 4A is a flow chart illustrating a process for discovering information about printing devices on a network and organizing the information into particular device lists.

FIG. 4A is a flow chart illustrating a process 400A for discovering information about printing devices on a network and organizing the information into particular device lists. Process 400A includes steps 402 through 410. The order in which the process is described is not intended to be construed as a limitation. Furthermore, the process can be implemented in any suitable hardware, software, firmware, or combination thereof.

In step 402, the network manager tool 104 performs a discovery process of searching the network 100 for printing devices 102. As mentioned above this discovery operation can be performed on an automatically scheduled basis or initiated by a user.

In step 404, the network manager tool 104 records information associated with printing devices 102 discovered on the network in a main device list 302.

In step 406, the network manager tool 104 receives a user input that defines one or more criterion (e.g., Criterion X, Y and/or Z) defining a subset of information about the printing devices that satisfy the one or more criterion. Step 406 can be optionally performed at any time in process 400A by the user. The criterion can be stored in a file that is assessable to filter 306.

In step 408, the filter 306 queries the main device list for any information that matches any of the criterion set by the user in step 410. Step 408 can either be performed at regularly scheduled intervals or initiated by a user.

Finally, in step 410, if the filter 306 locates any information that matches the one or more criterion, then the network manager tool 104 automatically records such information in the secondary device list 304 associated with the particularly defined criterion. In other words, the filter 306 enables at least a portion of the information from the main device list 302 to be placed into one or more secondary lists 304 based upon criteria that define each of the one or more secondary lists 304.

Figure 4B:
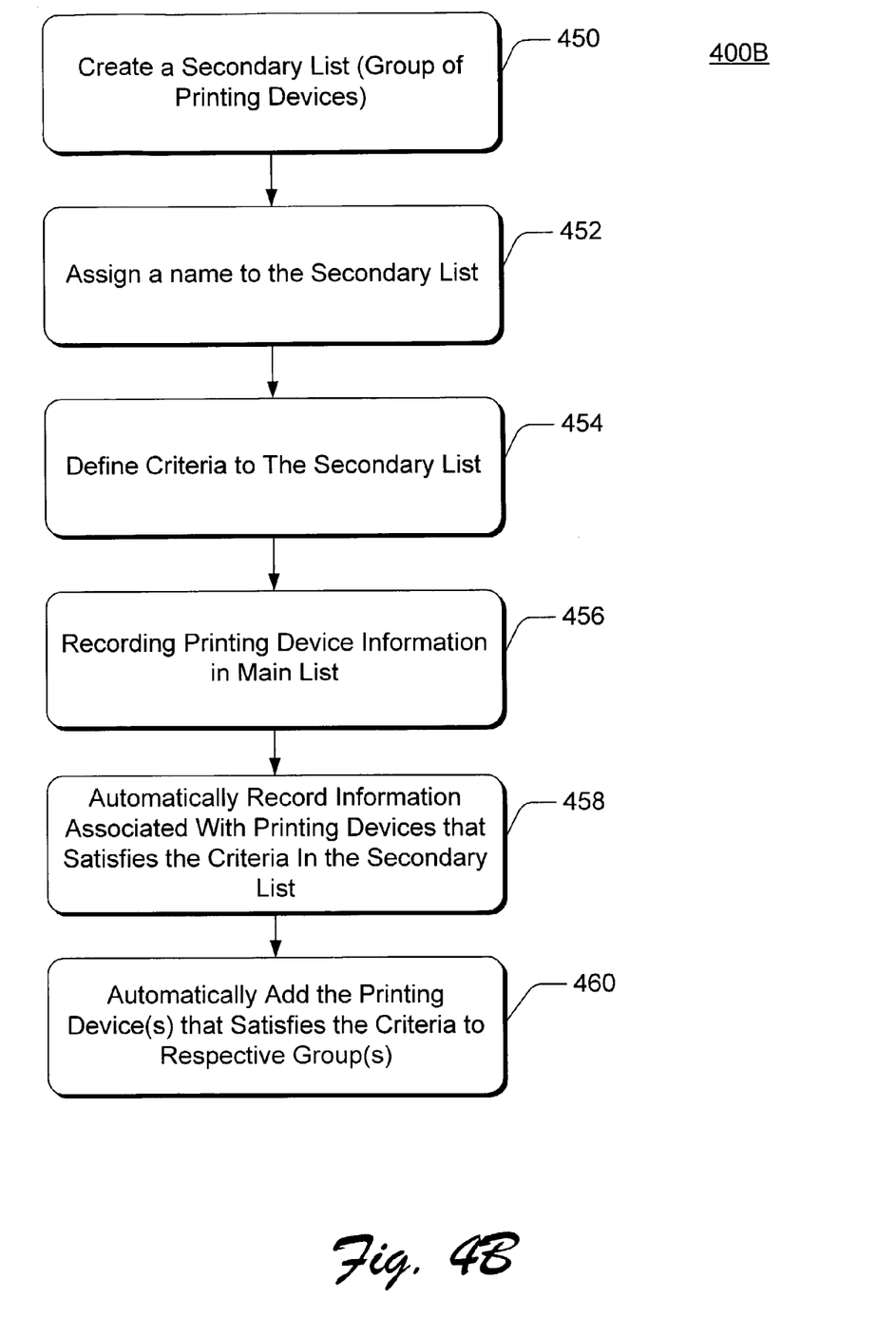
FIG. 4B is a flow chart illustrating another exemplary process for discovering information about printing devices on a network and organizing the information into particular secondary lists.

FIG. 4B is a flow chart illustrating another exemplary process 400B for discovering information about printing devices on a network and organizing the information into particular secondary lists. Process 400B includes steps 450 through 460. The order in which the process is described is not intended to be construed as a limitation. Furthermore, the process can be implemented in any suitable hardware, software, firmware, or combination thereof.

In steps 450 and 452, a secondary list 304 is created by assigning to the list (e.g., "Criterion X," "Criterion Y", etc. see FIG. 3). Next, in step 454, rules (or criteria) are assigned to the particular secondary list 304 that a printer must satisfy in order to be included as member of the secondary list. In step 456, the network management tool 104 automatically discovers printing devices on the network 100 and automatically populates the main device list 302 with information pertaining to printing devices generally discovered on the network 100. In step 458, the network management tool 104 uses the filter 306 to select printing devices from the main device list 302 that satisfies criteria assigned to the secondary list 304. In step 460, the network management tool 104 further delineates the secondary list 304 by populating subgroups within the secondary list 304 with the printing devices from the main device list 302 that match the group criteria 308, 310 and 312.

Figure 5:
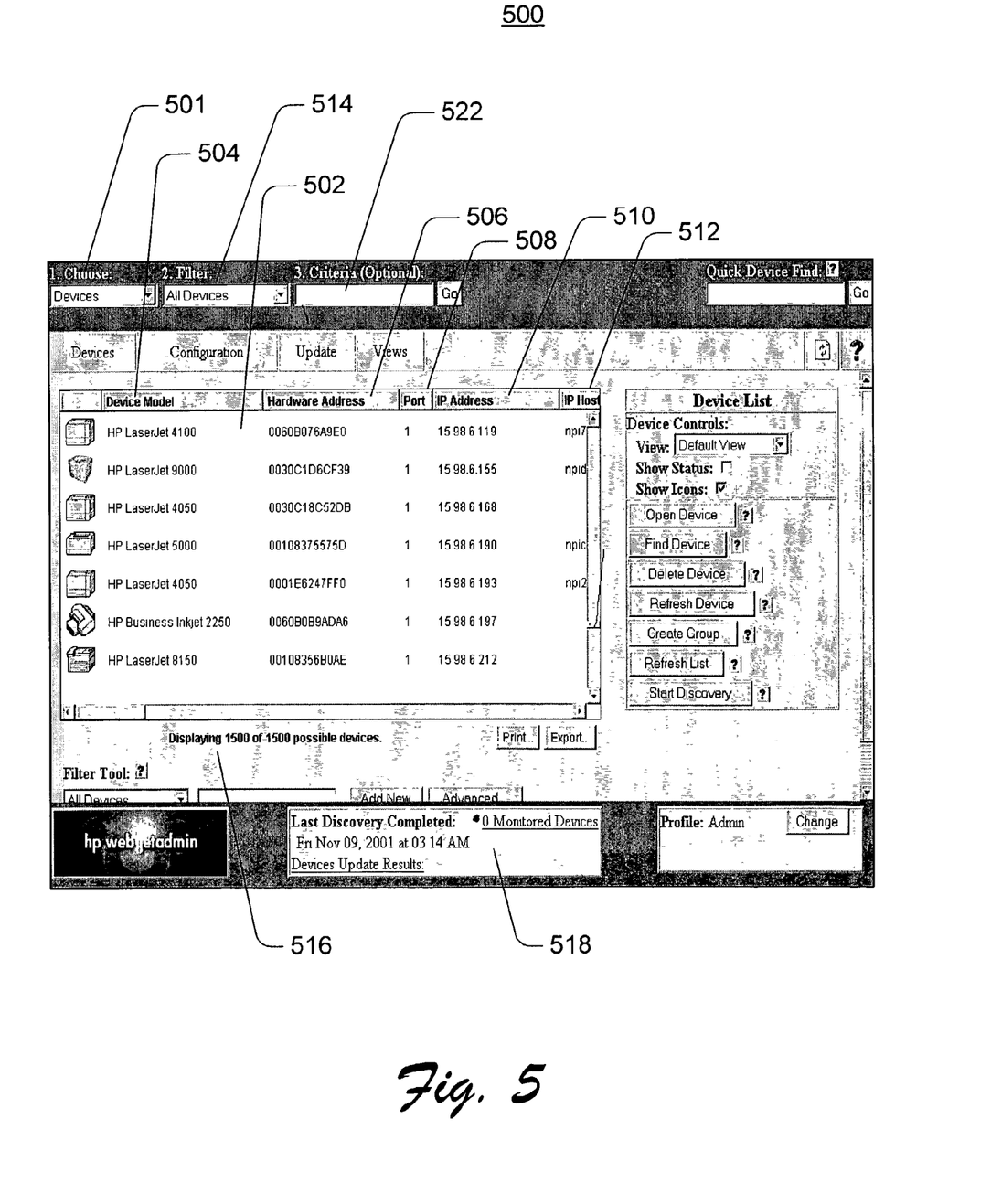
FIG. 5 illustrates an exemplary graphical display user interface for depicting information associated with printer devices.

FIG. 5 illustrates an exemplary graphical display user interface 500 for depicting information associated with printer devices. In this example, the user interface 500 includes a display area 502 that shows information associated with the main printer device list 302. Initially, a user is able to choose the main device list by selecting "Devices" from a menu drop-down list 501. In this example, a filter menu drop-down list 514 is also selectable by the user, which in this example shows that "All Devices" are selected; meaning that all printer devices from the main device list 302 will be displayed in the display area 502. Thus, at the bottom of the display area 502, a quantity indicator 516, indicates that 1500 of a possible 1500 possible devices are displayed in display area 502.

Included in the display area 502 are columns 504, 506, 508, 510, 512 that define particular types of information associated with the printing devices 102. For instance, the "Device Model" column 504 organizes information associated with a model type for a printing device such as the HP LaserJet® 4100 printer, HP LaserJet® 9000 printer, and so forth. The next column is the "Hardware Address" column 506, which lists the particular hardware address for each printing device. Port column 508 lists the port on which each printing devices is connected. IP Address column 510 lists the IP address for each the printing device. And the IP host column 512, lists the IP host that each printing device is hosted by.

The user interface 500 also includes a discovery status window 518 that shows the current status of a discovery. In the exemplary implementation, discovery status window 518 will either show that a discovery is in progress, or it will show the time when a discovery was last completed, e.g., Friday Nov. 9, 2001 at 03:14 AM.

The user interface 500 also includes a window 522 for specifying and defining criteria for a group of devices. The user can type into window 522 one or more criterion for the group. The user can also define criteria for a group of devices by selecting the filter menu drop-down list 514 and specifying a particular group of devices that the user desires to view. The user can also specify a group of the printer devices by selecting particular properties from the filter menu drop-down list 514. These properties can include particular capabilities of printing devices, the hardware address, IP address, IPX Name, IPX address, and other related properties.

Figure 6:
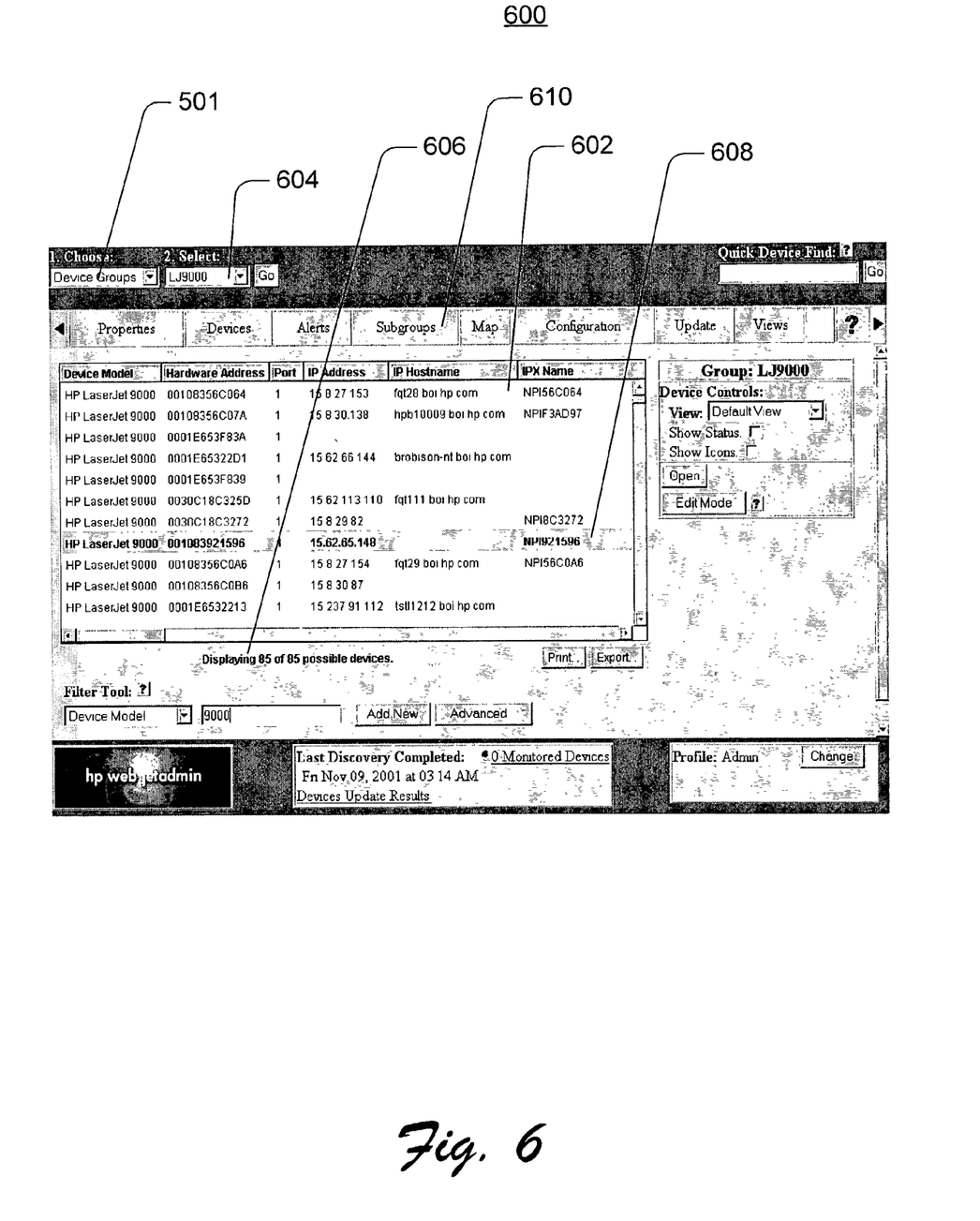
FIG. 6 illustrates an exemplary user interface for depiction of information associated with printing devices that satisfy defined criteria for a group of printing devices.

FIG. 6 illustrates an exemplary user interface 600 for depiction of information associated with printing devices that satisfy defined criteria for a group of printing devices. In this exemplary illustration, the criterion for the group is all information associated with a LJ9000 model type printing device (i.e., HP's Laser Jet 9000 brand Laser Jet printer). To exhibit information pertaining to this group, the user selected "Device Groups" from the drop-down menu list 501. Next, the user defines the particular device group by selecting the filter menu drop-down list 604 and specifying LJ9000 as the criterion for the group. Accordingly, the display area 602 displays information pertaining to those printing devices that satisfy the defined criterion. For this particular group the quantity indicator 606 indicates that 85 of a possible 85 printing devices are displayed in the display area 602.

In this exemplary implementation, the user interface 600 further defines any newly discovered printing devices for the group LJ9000 by bolding the particular entry (see 608). That is, the bold entry 608 represents a newly discovered printing device on a network, such as network 100 that satisfies the LJ9000 criterion for the group.

A subgroup menu button 610 permits a user to further define a subset of information located in a group. This is accomplished by depressing button 610 which provides the user with additional mechanisms (such as a drop-down menu or type-in window) to search the group for particular printing devices that satisfy criterion for the subgroup. This allows users to quickly display subgroups from with a group.

Thus, user interfaces 500 and 600 (FIGS. 5 and 6, respectively) permit the network administrator to dynamically view information associated with printing devices discovered on a network. The user can view inventory information pertaining to printing devices in a main device list, or secondary devices lists that organizes the information into defined groups based on user defined criteria.

In one implementation of the functionality associated with the network manager tool 104 as described above may be stored on or transmitted across some form of computer-readable media. Computer-readable media can be any available media that can be accessed by a processor. By way of example, and not limitation, computer readable media may comprise volatile and non-volatile media for the storage of information, such as instructions, logic, modules or other functional and non-functional structures.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer-readable storage media comprising computer executable instructions that, when executed by a processor, direct a computing system to perform a method comprising:
- discovering printing devices on a network by monitoring for signals indicating that the printing devices are present on the network;
- recording information about the printing devices in a main device list;
- organizing at least a portion of the information from the main device list into one or more secondary device lists based upon criteria that define each of the one or more secondary device lists, wherein a newly discovered printing device on the network which satisfies the criteria is visually denoted to a user in a graphical display of the one or more secondary device lists and wherein user input defines the criteria, one type of user input being textual criteria information typed into a graphical interface by a user; and
- updating the one or more secondary device lists each time a new printer device is discovered on the network by recording information about the newly discovered printing device in the one or more secondary device lists, if information pertaining to the newly discovered printing device matches any of the criteria for the one or more secondary device lists.

2. One or more computer-readable storage media as recited in claim 1, wherein the method further comprises receiving a user input that defines the criteria by specifying a subset of the information about the printing devices that satisfy the criteria for the one or more secondary device lists.

3. One or more computer-readable storage media as recited in claim 1, wherein the method further comprises receiving a user input that selects a particular secondary device list from a directory of secondary device lists.

4. One or more computer-readable storage media as recited in claim 1, wherein the method further comprises receiving a user input that selects particular information associated with a particular secondary device list and displaying the particular information to the user.

5. One or more computer-readable storage media as recited in claim 1, wherein the method further comprises updating the main device list each time a new printer device is discovered on the network by recording information about the newly discovered printing device in the main device list.

6. One or more computer-readable storage media as recited in claim 1, wherein the method further comprises storing the main device list and the one or more secondary device lists in a database.

7. One or more computer-readable storage media comprising computer executable instructions that, when executed by a processor, direct a computing system to perform a method comprising:
- discovering printing devices on a network by monitoring for signals indicating that the printing devices are present on the network;
- recording information associated with the printing devices in a main list;
- querying the main list for information associated with the printing devices that satisfy a specified criterion;
- recording information associated with the printing devices that satisfy the specified criterion in a secondary list, wherein a newly discovered printing device on the network which satisfies the criterion is visually denoted to a user in a graphical display of the secondary list and wherein user input defines the criterion, one type of user input being textual criterion information typed into a graphical interface by a user; and
- updating the secondary list each time a new printer device is discovered on the network by recording information about the newly discovered printing device in the secondary list, if information pertaining to the newly discovered printing device matches the specified criterion for the secondary list.

8. One or more computer-readable storage media as recited in claim 7, wherein the method further comprises maintaining the main list and the secondary list in a database.

9. One or more computer-readable storage media as recited in claim 7, wherein the method further comprises querying the main list for information associated with the printing devices that satisfy the specified criterion each time a printing device is discovered on the network.

10. One or more computer-readable storage media as recited in claim 7, wherein the method further comprises receiving a user input that defines the specified criterion for the secondary list.

11. One or more computer-readable storage media as recited in claim 7, wherein the method further comprises displaying information recorded in the secondary list.

12. One or more computer-readable storage media as recited in claim 7, wherein the method further comprises receiving a user input enabling (i) the querying of the main list and (ii) the recording of information associated with the printing devices that satisfy the specified criterion in a secondary list.

13. One or more computer-readable storage media as recited in claim 7, wherein the method further comprises
- querying the secondary list for information associated with the printing devices that satisfy a further specified criterion; and
- recording information associated with the printing devices that satisfy the further specified criterion in a third list.

14. A computer system having a memory and a processor for collecting information about printing devices on a network, comprising:
- means for discovering printing devices on a network by monitoring for signals indicating that the printing devices are present on the network;
- means for recording information associated with the printing devices in a main list;

means for automatically querying the main list for information associated with the printing devices that satisfy a specified criterion;

means for automatically recording information associated with the printing devices that satisfy the specified criterion in a secondary list, wherein a newly discovered printing device on the network which satisfies the criterion is visually denoted to a user in a graphical display of the secondary list and wherein user input defines the criterion, one type of user input being textual criterion information typed into a graphical interface by a user; and means for updating the secondary list each time a new printer device is discovered on the network by recording information about the newly discovered printing device in the secondary list, if information pertaining to the newly discovered printing device matches the specified criterion for the secondary list.

15. The computer system as recited in claim 14, further comprising means for automatically querying the main list for information associated with the printing devices that satisfy the specified criterion each time a printing device is discovered on the network.

16. The computer system as recited in claim 14, further comprising means for receiving a user input that defines the specified criterion for the secondary list.

17. The computer system as recited in claim 14, further comprising means for displaying information recorded in the secondary list.

18. The computer system as recited in claim 14, further comprising means for automatically querying the secondary list for information associated with the printing devices that satisfy a further specified criterion; and recording information associated with the printing devices that satisfy the further specified criterion in a third list.

* * * * *